United States Patent
Zaman et al.

(10) Patent No.: US 7,835,877 B2
(45) Date of Patent: Nov. 16, 2010

(54) PROCESSES AND APPARATUS FOR BATTERY COMPENSATION

(75) Inventors: Sabih Qamaruz Zaman, Elm Grove, WI (US); Jonathan Mark Butzine, Oconomowoc, WI (US)

(73) Assignee: General Electric Company, Schenectady, NY (US)

( * ) Notice: Subject to any disclaimer, the term of this patent is extended or adjusted under 35 U.S.C. 154(b) by 1241 days.

(21) Appl. No.: 11/361,773

(22) Filed: Feb. 24, 2006

(65) Prior Publication Data

US 2007/0202836 A1 Aug. 30, 2007

(51) Int. Cl.
*G01R 29/02* (2006.01)
(52) U.S. Cl. .................. 702/79; 702/63; 455/343.1; 340/455; 320/155
(58) Field of Classification Search .............. 702/63, 702/79; 340/455; 324/429, 431; 320/134, 320/136
See application file for complete search history.

(56) References Cited

U.S. PATENT DOCUMENTS

| | | | | |
|---|---|---|---|---|
| 5,514,946 A * | 5/1996 | Lin et al. | ...................... | 702/63 |
| 5,670,861 A * | 9/1997 | Nor | ........................... | 320/118 |
| 5,909,660 A * | 6/1999 | Foote | ......................... | 702/189 |
| 6,915,220 B2 * | 7/2005 | Cardinal et al. | ............... | 702/63 |

* cited by examiner

*Primary Examiner*—Mohamed Charioui
*Assistant Examiner*—Elias Desta
(74) *Attorney, Agent, or Firm*—William Baxter, Esq.; Michael G. Smith, Esq.

(57) ABSTRACT

Systems, processes and apparatus are described through which signals are received from a controller, where the signals include a power ON signal. A time measurement element is started responsive to the power ON signal to assess a current duration of operation of the system. An existing cumulative record of system operation is recalled from a non-volatile memory in the system and the existing cumulative record is combined with the current duration to provide a representation of a running elapsed time, which is recorded in the non-volatile memory and is compared to a threshold to provide an indication when the running elapsed time has traversed the threshold.

20 Claims, 5 Drawing Sheets

PROCESSES AND APPARATUS FOR BATTERY COMPENSATION

FIELD OF THE DISCLOSURE

This disclosure relates generally to concerns associated with retrofitting of existing systems with additional modules, in particular to battery-life conservation in view of battery loading modifications system applications, and more particularly, to techniques for facilitating such in a context of mobile nondestructive evaluation tools, including tools employed in medical diagnosis.

BACKGROUND

Many medical diagnoses rely on non-invasive diagnostic tools to provide information, often in the form of images, descriptive of status of internal portions or organs of a patient. These tools include thermal imaging (e.g., mammography), ultrasonic probes, magnetic resonance imaging techniques, positron emission tomography, computed tomography (CT), single photon emission-computed tomography (SPECT), optical imaging and/or X-ray based techniques. In some minimally invasive instances, imaging aids, such as contrast-enhancing agents, are introduced into the subject or patient to aid in increasing available data content from the non-destructive imaging technique or techniques being employed.

Each of these tools presents advantages in particularized situations, has technological limitations, may require set-up and analysis time, can include risks and also has associated costs. As a result, a cost-benefit analysis that also reflects the degree of urgency with respect to a particular diagnostic trajectory often favors usage of X-ray based measurement techniques.

However, exposure to X-rays can result in some risk to the test subject or patient. For at least this reason, the dosage of X-rays incident on the patient, organ or object being evaluated/imaged, is often carefully chosen and controlled, for example, variables such as current to the X-ray tube (mA or milliAmperes), peak voltage applied to the X-ray tube (kVp or kilovolts peak) and exposure time, and by selecting and defining an area to be exposed to provide successful imaging via masking, based on the task and the test subject or patient's parameters, with least health risk to the patient or radiation exposure to the object being imaged. The Food and Drug Administration has recently identified X-rays as potentially having carcinogenic effects, adding impetus to the desire to reduce overall exposure while still providing imaging characteristics capable of enabling rapid, effective and accurate diagnostic aids.

Several factors influence image quality resulting from an X-ray procedure. Statistical photon noise resulting from characteristics of the X-ray source and the X-ray generation conditions tends to dominate other noise sources in formation of an X-ray image. Signal conditioning consistent with achieving suitable contrast between various image portions, and contrast enhancement techniques, are also important considerations in providing diagnostic images, and these issues require increasingly sophisticated treatment as dose and/or photon energy are decreased.

One of the key tenets of medical X-ray imaging is that image quality should be carefully considered in determining exposure conditions. Exposure considerations include predetermined dose criteria vis-a-vis dose of X-rays delivered to the test subject or patient in order to provide images. The design and operation of a detector used for medical X-ray imaging should therefore be tailored, responsive to the particularized task and measurement conditions, including variables in test subject mass, opacity and the like, to provide high image quality for each X-ray exposure that is incident at its input. However, diagnostic medical tools such as X-ray imaging systems are precision instruments, very carefully designed, and then built to exacting standards. As such, these kinds of imaging systems represent significant capital investments. Additionally, training personnel to maintain and calibrate such equipment, to operate and then to interpret data obtained via these diagnostic tools also encompasses additional investment. Also, comparison of data from one assessment to another, and from one timeframe to another, is greatly facilitated when the data are collected and processed in a relatively well-understood context. At the same time, technical developments may provide opportunity to leverage existing infrastructural elements by retrofitting them using sophisticated, newly-developed technological subsystems, and this also may facilitate capabilities not present in the ensemble of systems elements contemplated at initial design and deployment.

For example, X-ray systems and other non-destructive and largely non-invasive characterization devices have realized dramatic changes in capability during the last century or more. Medical diagnostic capabilities unimaginable prior to C. W. Roentgen's observations of X-rays images in 1895 have fostered intense and remarkably fruitful research, study and development, improving medical treatment capabilities to such an extent as to have, in turn, played pivotal roles leading to conception and subsequent maturation of entirely new medical specialties and treatment options.

One new tool resulting from this research employs pixelated X-ray detectors (detectors comprising a geometric array of multiple detector elements, where each detector element may be individually representative of at least a portion of a picture element in the resultant image). These detectors are increasingly being employed, particularly for medical imaging. Among other things, they facilitate digital representation of images and other data resulting from usage of the systems, which, in turn, enables digital signal processing, data storage and data transmission technologies.

A significant result of these technological innovations is that the potential and capability for real-time consultation between multiple experts, such as medical doctors, during what is called the "golden hour" following a medically-significant event, is greatly enhanced. Representation of such information in digital formats eases transmission, reception and standardized display of the information without incurring loss of acuity of data obtained from the measurement process and greatly eases reduction of noise from the transmission/reception process. Provision of capability for multiple experts to collaborate virtually instantly, even from geographically diverse locations. In turn, this facilitates such collaboration, despite extreme scenarios, e.g., triage following an unanticipated disaster. As a result, these capabilities represent strong impetus to incorporate new subsystems within existing diagnostic instruments.

However, incorporation of embodiments of such subsystems may result in some types of incompatibilities within the systems themselves. Aspects of system performance other than those bearing directly on factors motivating addition of modules incorporating recent advances can then have somewhat subtle, and unforeseen, impact on overall system performance, operation and maintenance issues.

For the reasons stated above, and for other reasons discussed below, which will become apparent to those skilled in the art upon reading and understanding the present disclosure, there are needs in the art to provide modified system input/ output and/or maintenance information in support of increasingly stringent and exacting performance and economic standards in settings such as medical instrumentation.

SUMMARY

The above-mentioned shortcomings, disadvantages and problems are addressed herein, which will be understood by reading and studying the following disclosure.

In one aspect, a signal conditioning module configured for insertion into a system is disclosed. The module is configured to (i) receive signals from a controller contained in the system, where the signals include a power ON signal, and to (ii) initiate a time-measurement element responsive to the power ON signal to assess a current duration of operation of the system. The module is also configured to (iii) recall an existing cumulative record of system operation from the non-volatile memory, (iv) combine the existing cumulative record with the current duration to provide a representation of a running elapsed time and (v) record the running elapsed time in the non-volatile memory. The module is further configured to (vi) compare the running elapsed time to a threshold and (vii) indicate when the running elapsed time has traversed the threshold.

In another aspect, a process operative in the context of a system having non-volatile memory capability includes acts of (i) receiving signals, including a power ON signal, from a controller contained in the system, (ii) initiating a time-measurement element responsive to the power ON signal to assess a current duration of operation of the system and (iii) recalling an existing cumulative record of system operation from the non-volatile memory. The process additionally includes acts of (iv) combining the existing cumulative record with the current duration to provide a representation of a running elapsed time, (v) recording the running elapsed time in the non-volatile memory, (vi) comparing the running elapsed time to a threshold and (vii) indicating when the running elapsed time has traversed the threshold.

In a yet another aspect, an article of manufacture embodies computer code that includes computer-readable instructions, which, when executed by one or more processors, causes the one or more processors to perform acts of (i) receiving signals including a power ON signal from a controller contained in the system, (ii) initiating a time-measurement element responsive to the power ON signal to assess a current duration of operation of the system and (iii) recalling an existing cumulative record of system operation from the non-volatile memory. The computer code further includes instructions to cause the one or more processors to perform acts of (iv) combining the existing cumulative record with the current duration to provide a representation of a running elapsed time, (v) recording the running elapsed time in the non-volatile memory, (vi) comparing the running elapsed time to a threshold and (vii) indicating when the running elapsed time has traversed the threshold.

Systems, clients, servers, processes, and computer-readable media of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which are shown, by way of illustration, specific embodiments which may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments.

As used herein, the term "illumination" refers to exposure to photons, electromagnetic radiation, phonons (e.g., insonification via ultrasound) or other wave phenomena, which do not necessarily correspond to light that is visible to a human eye. Ranges of parameter values described herein are understood to include all subranges falling therewithin. The following detailed description is, therefore, not to be taken in a limiting sense.

The detailed description is divided into six sections. In the first section, a system level overview is described. In the second section, adaptive system elements are described. In the third section, embodiments of processes are described. In the fourth section, several examples are described. In the fifth section, hardware and an operating environment in conjunction with which embodiments may be practiced are described. In the sixth section, a conclusion of the detailed description is provided. A technical effect of the systems and processes disclosed herein includes at least one of facilitating capability for estimation of discharge status of batteries employed in mobile X-ray systems.

I. SYSTEM OVERVIEW

Figure 1:
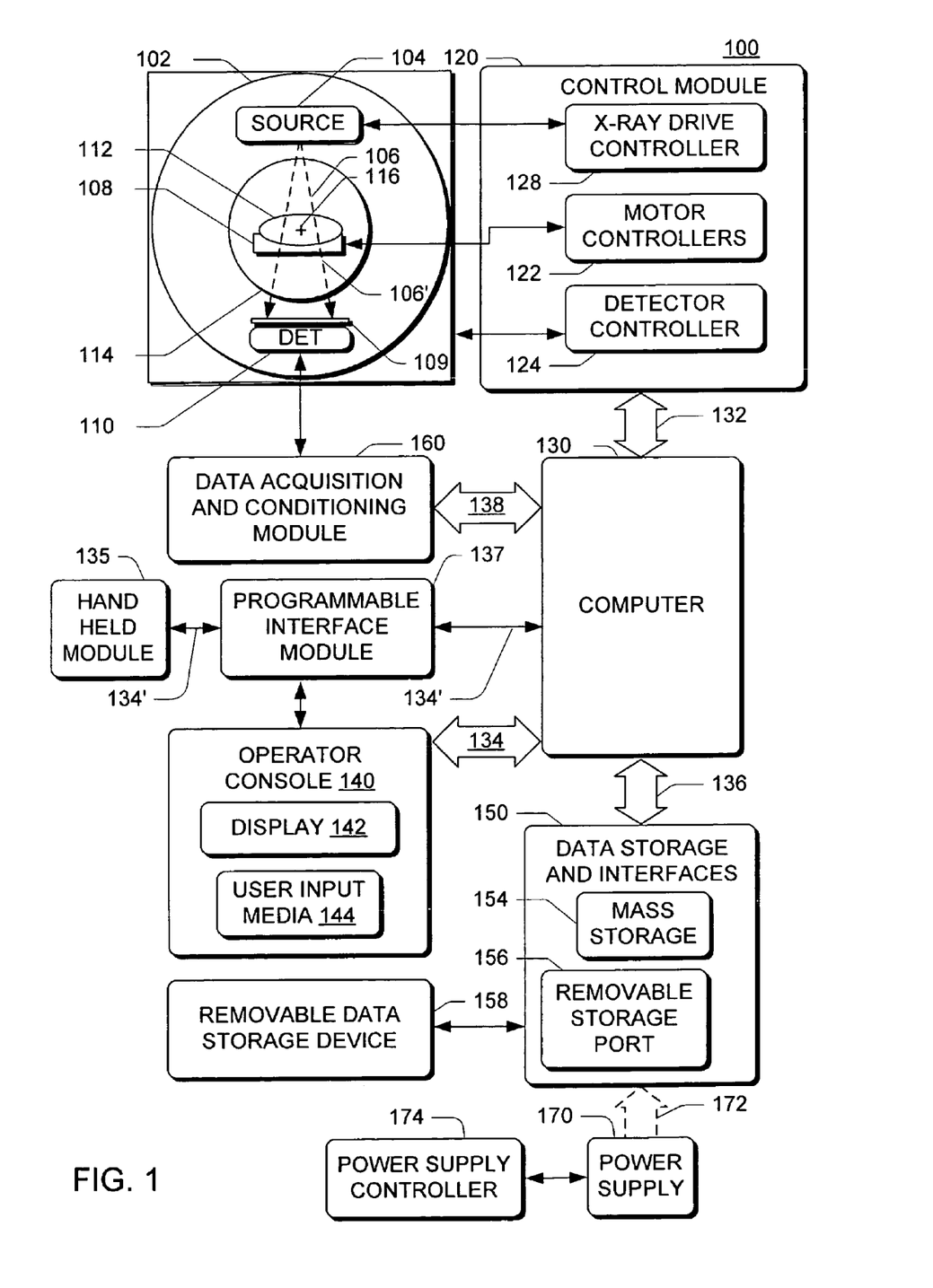
FIG. 1 is a simplified block diagram of an overview of a system configured to improve X-ray imaging operations.

FIG. 1 is a simplified diagram of an overview of a system 100 configured to improve X-ray imaging operations. In particular, the system 100 is configured to provide digitized images from non-destructive imaging systems based on X-ray radiation, while reducing the radiation dose delivered to the object or patient being imaged, compared to conventional X-ray imaging systems and processes. The system 100 optionally includes a gantry 102 or other support for an illumination source 104, such as an X-ray illumination source, capable of providing illumination 106, such as X-rays or other non-destructive internal imaging illumination, a test subject support 108 that is transmissive with respect to the illumination 106 and that is positioned above imaging media such as a scintillator 109 and detector 110 that is also opposed to the illumination source 104.

Components of the system 100 and a test subject 112 are maintained in a defined geometric relationship to one another by the gantry 102. A distance between the illumination source 104 and the detector 110 may be varied, depending on the type of examination sought, and the angle of the illumination 106 respective to the test subject 112 can be adjusted with respect to the body to be imaged responsive to the nature of imaging desired.

The test subject support 108 is configured to support and/or cause controlled motion of the test subject 112, such as a living human or animal patient, or other test subject 112 suitable for non-destructive imaging, above imaging media, such as film, fluoroscope screen or scintillator 109/detector 110 so that illumination 106' is incident thereon after passing through the test subject 112. In turn, information from the detector array 110 describes internal aspects of the test subject 112.

In one embodiment, the scintillator 109 may be a conventional CsI scintillator 109, optically coupled to an array of photodiodes (FIGS. 2 and 3, infra), such as a two-dimensional array of photodiodes and suitable control transistors formed using semiconductor material such as amorphous silicon, or any other form of detector 110 suitable for use with the type or types of illumination 106 being employed, such as X-rays. The detector elements are typically tessellated in a mosaic. The scintillator 109 converts incident photons comprising electromagnetic radiation, such as X-rays, from high-energy, high-frequency photons 106', into lower-energy, lower-frequency photons corresponding to spectral sensitivity of the detector elements, in a fashion somewhat analogous to fluorescence, as is commonly known in the context of many visible-light sources in use today. Alternatively, the detector 110 may be formed as a flat-panel array including amorphous Silicon ($\alpha$-Si) active elements, together with either a scintillator layer 109, or a direct converter material such as Cadmium Zinc Telluride (CdZnTe), Mercuric Iodide ($HgI_2$), Lead Iodide ($PbI_2$), or amorphous Selenium ($\alpha$-Se).

In some modes of operation, such as CT, the gantry 102 and test subject support or table 108 cooperatively engage to move the test subject 112 longitudinally, that is, along an axis extending into and out of the plane of FIG. 1 and within an opening 114. In some modes of operation, the gantry 102 rotates the X-ray source 104 and detector 110 about an axis 116 while the support 108 moves longitudinally to provide a helical series of scans of the test subject 112, where a pitch of the helices is defined as a ratio of a longitudinal distance traveled by the table 108 during a complete revolution of the gantry 102, compared to a length of the detector 110 along the axis of linear motion.

For example, when a longitudinal distance traveled by the table 108 during a single rotation of the gantry 102 is ca. 40 centimeters and the length of the detector 110 along the axis of motion is also ca. 40 centimeters, the pitch is one, with increased motion of the table 108 relative to length of the detector 110 during a revolution of the gantry 102 resulting in higher pitch. In general, lower pitch results in increased X-ray dose delivered to the test subject 112. The motion of the test subject support 108 and/or gantry 102 may be varied in conformance with a desired set of exposure parameters and/or image quality indices, as is explained below in more detail with reference to Section II et seq.

The system 100 also includes a control module 120, which may include a motor control module 122 configured to move the test subject support 108 and thus the test subject 112 relative to the X-ray source 104 and/or detector 110, and that may also control motors in the gantry 102 or to position the X-ray illumination source 104 relative to the test subject 112 and/or the detector 110. For example, in some types of imaging tasks, the X-ray illumination source 104 is rotated in a circular pattern within a fixed plane at a fixed height above the test subject 112 being studied, and the X-ray source 104 is continuously tilted during that rotation to provide a cone-shaped locus of X-rays 106, with the apex of the cone being at or near the region being imaged.

The controller 120 includes a detector controller 124 configured to control elements within the detector 110 and to facilitate data transfer therefrom. The controller 120 also includes a drive parameter controller 128 configured to control electrical drive parameters delivered to the X-ray source 104. One or more computers 130 provide connections to the controller 120 via a bus 132 configured for receiving data descriptive of operating conditions and configurations and for supplying appropriate control signals, as will be described below in more detail with reference to Section II et seq. Buses 134 and 134' act to transfer data and control signals, for example with respect to a module 135, via interconnections such as 134', such as to and/or from the computer 130.

In one embodiment, a field-programmable and reprogrammable interface module 137 may be inserted serially with the interconnection 134', at a juncture midstream in the useful service life of the system 100 as one of several related modifications of the system 100, in order to modify functionality of the system 100 and the module 135, and thus to accommodate enhanced capabilities of the system 100 realized through revised hardware or software modules that have been retrofitted or incorporated into the system 100. Addition of revised modules may present operational parameters, or operational parameter modifications, not comprehended original design goals for the system 100, and the interface module 137, by modifying data exchanges appropriately, thus facilitates enhancement of system capabilities, without needlessly sacrificing ancillary components of the system 100.

The system 100 also includes a bus 136 and a bus 138. An operator console 140 is coupled to the system 100 through the bus 134. The operator console 140 includes one or more displays 142 and a user input interface 144. The user input interface 144 may include a keyboard, a mouse or other tactile input device, capability for voice commands and/or other input devices. The one or more displays 142 provide video, symbolic and/or audio information relative to operation of system 100, user-selectable options and images descriptive of the test subject 112, and may include a graphical user interface for facilitating user selection among various modes of operation and other system settings.

The system 100 also includes memory devices 150, coupled via the bus 136 to the computer 130 through suitable interfaces. The memory devices 150 include mass data storage capabilities 154 and one or more removable data storage device ports 156. The one or more removable data storage device ports 156 are adapted to removably couple to portable data memories 158, which may include optical, magnetic and/or semiconductor memories and may have read and/or write capabilities, and which may be volatile or non-volatile devices or may include a combination of the preceding capabilities.

The system 100 further includes a data acquisition and conditioning module 160 that has data inputs coupled to the detector 110 and that is coupled by the bus 138 to the one or more computers 130. The data acquisition and conditioning module 160 includes analog to digital conversion circuitry for capturing analog data from the detector 110 and then converting those data from the detector 110 into digital form, to be supplied to the one or more computers 130 for ultimate display via at least one of the displays 142 and for potential storage in the mass storage device 154 and/or data exchange with remote facilities (not shown in FIG. 1). The acquired image data may be conditioned in either the data acquisition and conditioning module 160 or the one or more computers 130 or both.

The system 100 also includes a power supply 170, coupled via interconnections represented as a power supply bus 172, shown in dashed outline, to other system elements, and a power supply controller 174. In some embodiments, the system 100 is configured to be a mobile system equipped with a portable power supply 170, such as a battery. In other words, the system 100 may comprise a wheeled unit and may be electromotively powered in self-contained fashion, lending physical agility to the ensemble of attributes offered by the system 100.

In some settings, such as an emergency room, articulation of a mobility function may be limited to motion of a system 100 that is generally dedicated to application within that setting, suite or environment. In other settings, such mobility may include scheduled sequential visits to areas such as a cardiac unit, an ICU and other loci, where such imaging capability provides critical assistance, such as when the test subject 112 is not postured in a fashion consistent with movement of the test subject 112 and yet aperiodic variations in work load are not favorable to cost-effective deployment of a system 100 incapable of ready, self-propelled, operator-guided, "at need" physical translation of location. In one embodiment, electrically-powered motors coupled to a drive train effectuate operator-directed motion of the system 100.

In turn, rechargeable batteries 170, which may be conventional lead-acid batteries or other battery types consistent with voltage and current attributes of the system 100, have finite useful lifetime. One aspect of battery life is related to charging and discharging cycles, depth of discharge during the discharge cycles and other factors. A generalized relationship descriptive of battery life is that battery life includes an exponential dependence on depth of repeated battery discharge in the course of normal use and recharging cycles. In other words, when a battery is repeatedly discharged below a given threshold value, useful battery life is decreased in comparison to a scenario in which a substantially identical battery is recharged prior to discharge achieving the threshold value, and observed decrease in battery life is significant with thresholds below fifty percent of battery charge capacity. As a result, benefits accrue from accurate monitoring or projections of battery discharge status linked with recharging cycles scheduled in conformance with knowledge of actual or projected battery power draw.

Figure 2:
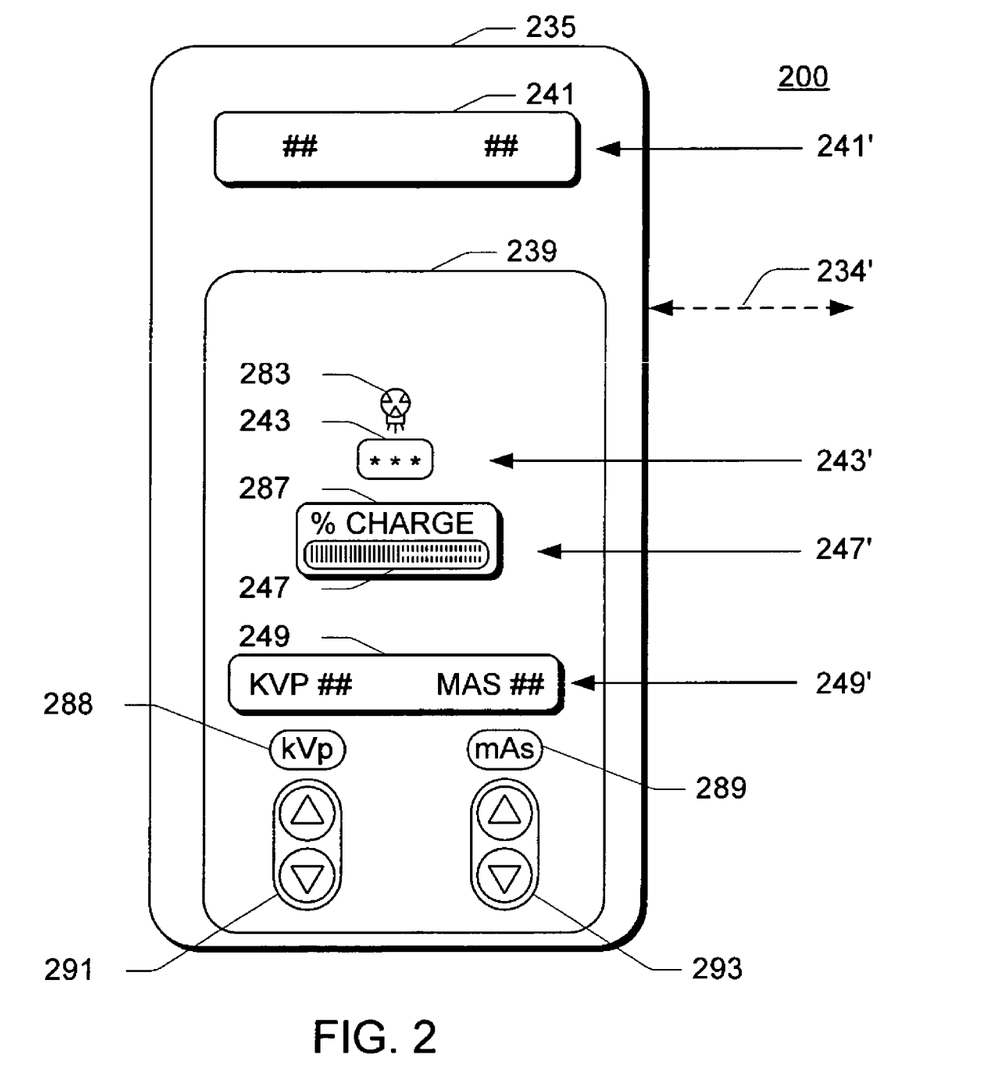
FIG. 2 is a simplified representation of a remote display and input/output element useful in the context of the system of FIG. 1.

FIG. 2 is a simplified representation 200 of a bus 234' coupled to a remote display and input/output element 235 that is useful in the context of the system of FIG. 1. The bus 234' is counterpart to the bus 134' of FIG. 1, and the display and input/output element 235 is analogous to the module 135 of FIG. 1. The remote I/O element 235 includes a control/display panel 241 and may include more than one hand-portable unit. For example, in the context of an X-ray imaging system 100, a physically separate switch (not explicitly shown in FIG. 1 or 2) may be usefully employed for triggering energization of the X-ray source 104 via operator control.

The input/output element 235 includes optical displays 241, 243, 247 and 249 configured to display indicia 241', 243', 247' and 249', respectively, indicative of status of various elements of the system 100. The input/output element 235 includes indicia 283, 287, 288 and 289 as well as tactile input elements 291 and 293.

The optical display 241 provides indicia 241' descriptive of system drive settings relative to the X-ray source 104, which settings are adjustable via the tactile input elements 291/293 in cooperation with the selected settings as displayed on optical display 249, but which may alternatively be determined by other system elements, subject to operator confirmation via user review, in conformance with particularized imaging tasks, empirical data from prior measurements or images and the like. The optical display 249 provides indicia 249' of user-selected settings as such are modified or set by a system operator.

The optical display 247 provides indicia 247' of consumable or renewable system resources, such as remaining useful battery capacity, in the example of FIG. 2 and as denoted by markings 287. In one embodiment, the optical display 247 comprises a bar-graph display (in conformance with the example of FIG. 2) such as a 48-segment bar-graph display element, shown at approximately fifty percent in this example, as denoted by the display elements in full line form at the left half of the display 247 and the display elements in dashed line form at the right half of the display 247.

The marking 283 indicates in language-independent form that the optical display 243 corresponds to activation of system elements that require appropriate caution in operation, such as the X-ray source 104 of FIG. 1. Auditory signals often also are contemporaneously employed to affirmatively denote activation of such sources, due to harmful cumulative effects that may preferentially offer danger to operators of such systems.

In usage, desired settings selected via the remote I/O unit 235 as shown in the display 249 are communicated to the system 100 via signals, and system system-selected settings are received by the remote I/O unit 235 as noted on the display 241. These settings are reviewed, and values corresponding to the selected settings are stored along with data/images from operation of the system 100. The stored data, system settings and information denoted by indicia 241' and 249' should all agree for effective system operation.

II. ADAPTIVE SYSTEM ELEMENTS

In this section, adaptive and programmable aspects applicable to the system of FIGS. 1 and/or 2 are described. It will be appreciated that, while these concepts as disclosed and enabled below are phrased in terms of conventions such as particularized embodiments, other forms of description and other applications are applicable and may be employed, without significantly altering the teachings of the present disclosure.

Figure 3:
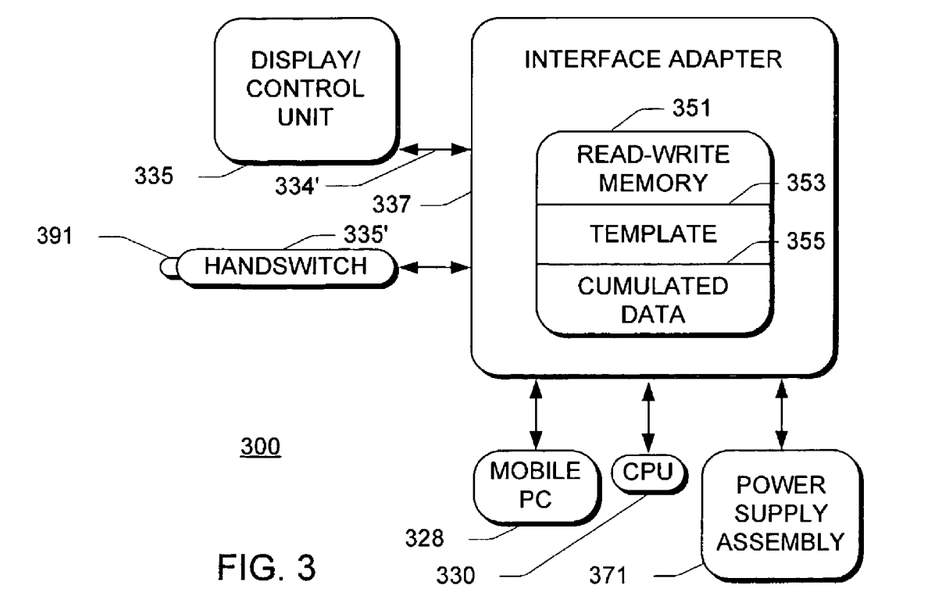
FIG. 3 is a simplified block diagram illustrating an interface adapter element and relationships to other system components that is useful in the context of the system of FIG. 1.

FIG. 3 is a simplified block diagram illustrating interface adapter elements 300 and relationships to other system components, useful in the context of the system 100 of FIG. 1. In FIG. 3, a mobile personal computer 328 and a central processing unit 330, similar in functional aspects to the computer 130 of FIG. 1, are depicted, coupled via a bus 334', to a remote display, control and input/output element 335 and/or a remote handswitch 335' through an interfacing module 337 containing a programmable memory 351 including a template portion 353 and a cumulative data portion 355.

The template portion 353 includes information descriptive of a current system configuration, as well as computer-readable instructions relevant to operating characteristics and commands associated with elements comprising the system 100, and may be provided with additional information by qualified personnel at such time as the system 100 is reconfigured. The cumulated data portion 355 maintains current information relative to operation of the system 100, as well as a running historical record relevant to subsystem components within the system 100.

The power supply assembly 371, analogous to the power supply 170 of FIG. 1, provides status signals via the interfacing module 337. The pushbutton 391 coupled to the handswitch 335' provides operator control as a fail-safe act for triggering X-rays for imaging, in conformance with operator inspection of various displays, such as those described with reference to FIG. 2 and/or monitor/display 142 of FIG. 1.

The interface adapter elements 300 may, for example, modify signaling and other functional aspects of cooperation between elements of the system 100 in conformance with added or replaced elements. For example, when an analog detection system originally supplied as a portion of the system 100 is replaced with a digital detection system, such as the detector 110 of FIG. 1, the control signals, system commands and status signaling, system power consumption variables and system capabilities may be modified in ways that could not have been envisioned at the initial stage of system design and thus could not be comprehended in the sensors and other operative elements when the system 100 was initially constructed.

Thus, field-programmable interface elements, such as the interface adapter/module 337 of FIG. 3 (analogous to the programmable interface module 137 of FIG. 1) may be employed in order to accommodate these revised system capabilities and to promote harmonious co-integration of the added modules within the existing infrastructure. These revisions may be accomplished even when the added system elements derive from independent manufacturers and do not include detailed co-integration data at all system levels associated with robust system functionality on multiple levels.

As a result, the original purchaser or current owner of such a system 100 is able to leverage successful prior product deployment and investment to achieve increased functionality in conformance with subsequent decisions by that purchaser. Further, such capabilities are achieved without incurring undue penalty that might otherwise accrue as a result of varying manufacturing standards, compatibility factors and protocols. In turn, such can provide particularly laudable aspects consanguineous with humanitarian applications to which X-ray imaging and other medical diagnostic systems are generally directed.

The interface adapter elements 300 include capability for coupling signals and data between infrastructural elements such as the mobile computer or PC 328 and/or the central processing unit 330 and control elements such as the display/control unit 335 and handswitch 335'. Typically, interconnections to elements such as mobile computer 328, central processing unit 330, display/control unit 335 and handswitch 335' represent infrastructural elements associated with prior system embodiments of the system 100.

The interconnections may support serial signal exchange protocols, which may be synchronous or asynchronous and/or parallel signaling capacities. The interface adapter 337 includes, among other things, information contained within the read/write memory 351, providing signal/data translational capabilities between system elements, including those comprising the system 100 prior to system modification, in view of considerations provoked as a result of system modification via hardware and/or software changes.

The read/write memory 351 may comprise a conventional field-programmable gate array, for example, that is updatable via data supplied by field service technical experts. Field-programmable gate arrays are known in the art and are commercially available from, for example, Xilinx, having headquarters at 2100 Logic Drive, San Jose, Calif. 95124-3400; Opera of Oslo, Norway; Altera, headquartered at 101 Innovation Drive, San Jose, Calif. 95134; and other manufacturers and vendors.

Such data may be introduced as modulation on a carrier wave embodying various types of computer or machine interpretable instructions. A removable data storage device 158, such as an optical disc (CD or DVD) may be coupled to the system 100 via a removable storage port 156, for example, or such instructions may be supplied via other, authorized, mechanisms, such as through a remote computer (discussed below with respect to FIG. 6), the Internet or other appropriate and approved sources, and may be applied directly to the interface adapter 137/337.

The read/write memory 351 may also include non-volatile memory elements, such as FLASH memory, capable of storing data representative of current status of one or more system elements. Examples of such data may include a number of times that the system 100 has been activated, for example, after one or more power supply elements 170 have been replaced, or data indicative of depth of discharge of such power supply elements 170 relative to a most-recent recharge cycle, a number of recharge cycles to which such power supply elements 170 have been exposed, information descriptive of power draw for the system 100 in the present configuration as a function of time, elapsed time following one or more events, such as a battery charging cycle, data specifically descriptive of present system configuration (type of detector, for example, and associated power requirements; type of batteries and typical operating parameters, date of installment or service/update of various system components) and may also optionally include data descriptive of ambient operating system conditions (temperature, achieved power supply voltage level, measured current draw from the power supply etc.).

Process embodiments operative with the system 100, remote module 235 and the interfacing adapter elements 300, together with benefits associated with their cooperative engagement, are described below in more detail with reference to FIGS. 4 and 5.

III. PROCESS EMBODIMENTS

In the previous section, modules capable of intercalation into previously-existing systems in furtherance of functionality with respect to system modifications were described. In this section, the developments and adaptations of that section are further employed as vehicles for describing the operation of a series of embodiments, with the particular processes of such embodiments being described by reference to relevant flowcharts. Describing the processes by reference to one or more flowcharts enables one skilled in the art to develop programs, firmware, or hardware, including such instructions configured to effectuate the processes, as well as subsequent revisions, through one or more processors responsive to computer-readable instructions embodied on computer-readable media.

These capacities are often accomplished using suitable computers, including one or more processors, by executing the instructions embodied in articles of manufacture such as computer-readable media, or as modulated signals embodied in a carrier wave. As a result, the computer-readable instructions may include capacity for accepting revised computer-readable information descriptive of revised capabilities, which may relate to revisions of aspects of the system 100 via substitution of components, revisions of data-processing structures and the like. Similarly, processes performed by server computer programs, firmware, or hardware also are represented by computer-executable instructions. The processes of the present disclosure are performed by one or more program modules executing on, or performed by, firmware or hardware that is a part of a computer (e.g., computer 130, FIG. 1), and/or interface adaptive elements 300.

In some embodiments, processes disclosed herein are implemented as a computer data signal embodied in a carrier wave, that represents a sequence of instructions which, when executed by one or more processors, such as a processor contained in or associated with the computer 130 in FIG. 1, causes the respective process to occur. In other embodiments, the processes disclosed herein are implemented as a computer-accessible medium having executable instructions capable of directing a processor, such as one or more processors contained in or associated with the computer 130 in FIG. 1, to perform the respective process. In varying embodiments, the medium is a magnetic medium, an electronic medium, or an electromagnetic/optical medium.

More specifically, in a computer-readable program embodiment, programs can be structured in an object-orientation using an object-oriented language such as Java, Smalltalk or C++, and the programs can be structured in a procedural-orientation using a procedural language such as COBOL or C. Software components may communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 130 in FIG. 1, or on multiple computers.

Figure 4:
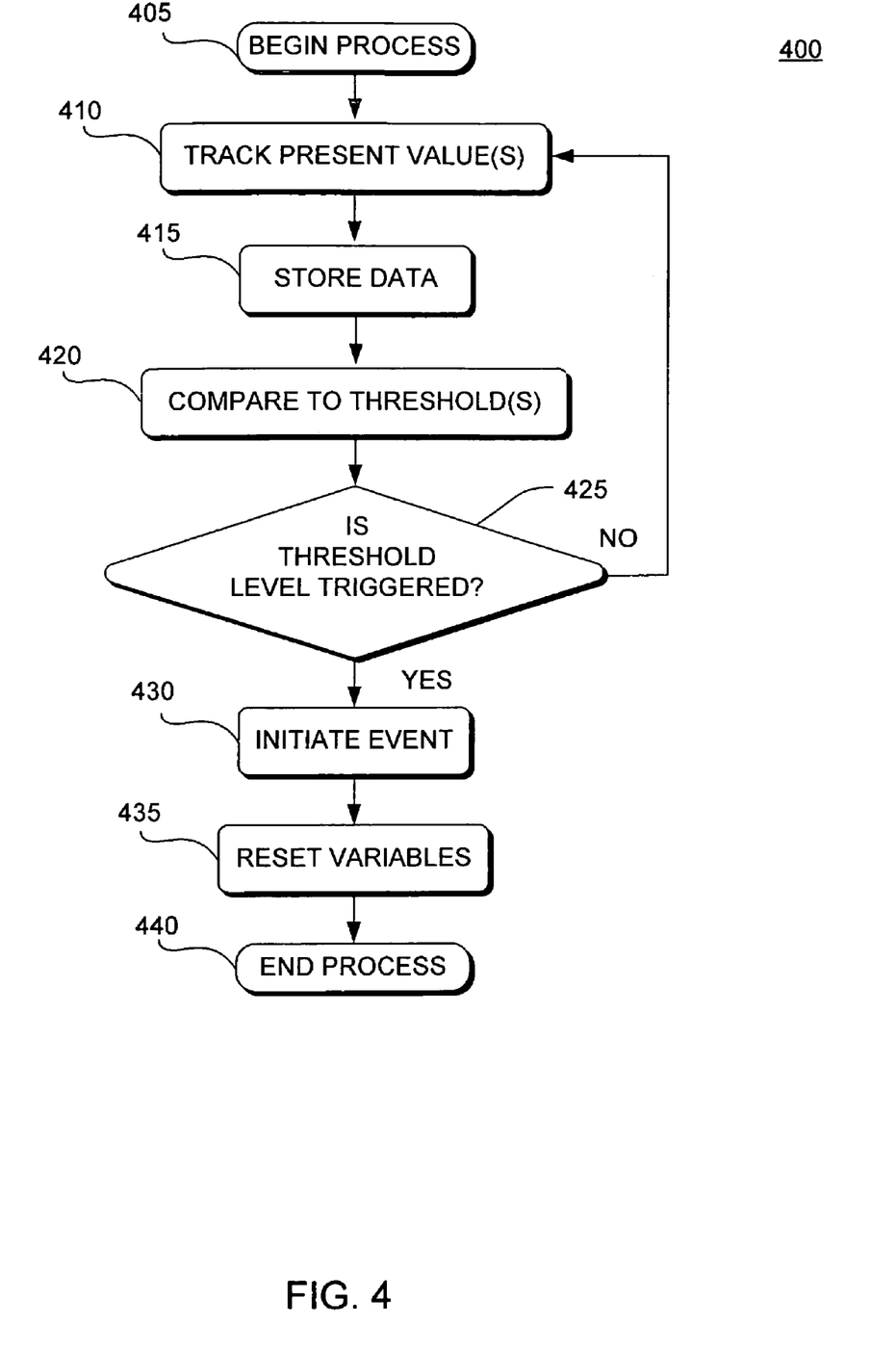
FIGS. 4 and 5 are flowcharts describing processes capable of utility in the system of FIG. 1.
Figure 5:
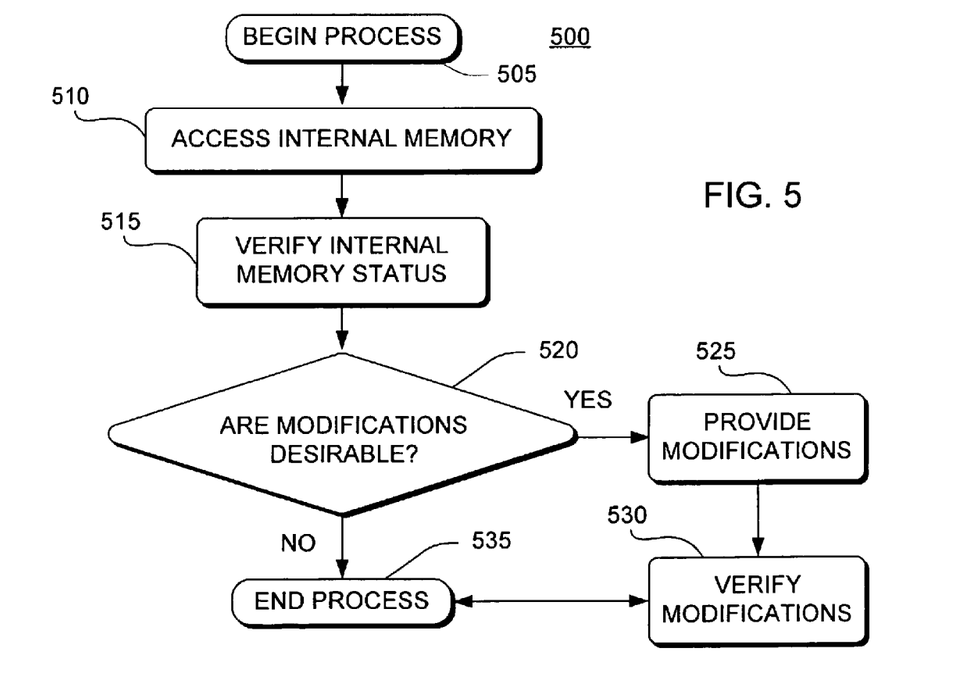

FIGS. 4 and 5 are flowcharts describing processes 400 and 500, respectively, capable of utility in the system 100 of FIG. 1. The processes 400 and 500 described above may be implemented as hardware or software or a combination thereof. The processes 400 and 500 may be updated via addition or substitution of machine-readable and executable instructions in computer-based controllers, as is described below in more detail with reference to FIG. 6.

FIG. 4 shows a flowchart of a process 400 configured for monitoring variables relative to operation of the system 100. The process 400 begins in a block 405. The process 400 may be initiated by a signal similar to a "power-on reset" signal, such as is provided in many electronic systems via comparison of voltage levels on different capacitors incorporated in separate circuits having different time constants, for example. Other methodologies for triggering the process 400 may be employed as well. Typically, initiation of the process 400 also includes rendering data that were at least temporarily stored in non-volatile memory, such as the read-write memory 351 of FIG. 3 and/or the memory system 150 of FIG. 1, available to a processing unit such as one or more microprocessors 330/130, although other data sources and/or controllers may be employed as well.

In a block 410, present values of contemporaneous variables relevant to system operation are tracked. The types of data rendered in the block 410 include relevant operating system parameters, historical data with respect to particular components, data including addenda specific to recent operative conditions and the like. Additionally, instruction sets or algorithms structured to facilitate incorporation of the information made available in the block 410 to one or more controllers, as well as present values tracked in the block 410, are employed to derive indications of impending system needs and to provide those indications to a system operator or supervisor (e.g., as noted above with respect to optical display 247, although other types of notifications may be tendered via other communications channels as well.

In a block 415, the present values obtained via the block 410 and/or computation results derived from them and other criteria are optionally stored in one or more memories, such as a non-volatile memory, e.g., as noted with respect to memory 351 (FIG. 3), as well as the block 410, are displayed via the remote I/O device 235 and/or system monitor 142 (FIG. 1). Actions associated with the block 415 may be triggered as a result of elapsed time, or consequential to events such as power supply disturbances indicative of likelihood of system reset functions, or in conformance with one or more predetermined events.

In a block 420, the data procured via acts associated with the block 410 are compared to appropriate threshold values, which threshold values may be stored within the read-write memory 351, for example, and which may be field-programmable by qualified personnel. For example, projected battery charge status indicia may be compared to threshold values reflective of present power requirements of the system 100 and/or knowledge specific to presently-applicable power storage capabilities/history of the system 100.

In a query task 425, comparison of presently-applicable data to one or more predetermined thresholds is effectuated. For example, as is described in detail below with respect to Examples I and II, operation time, including one or more of IDLE, STANDBY, EXPOSURE and other system operation modes, may be compared to one or more indicators of battery charge status. Other forms of data comparison may also be associated with the query task 425.

When the query task 425 determines that a threshold level has been triggered by comparison of operating system indicia to predetermined criteria, control passes to a block 430. When the query task 425 determines that a threshold level has not been triggered by comparison of operating system indicia to predetermined criteria, control returns to the block 410.

In the block 430, one or more events reflective of the threshold level triggered, as noted by the query task 425, may be initiated. The triggered event may be to provide notice to an operator, for example via the optical display 247 of FIG. 3, that a battery charging event is desirable, or soon may be so. The triggered event may include initiation of functions that are automatically processed by the computer 130, but employing one or more values, such as thresholds, that reflect current system configuration and that are field-programmable, which modification is described below in more detail with reference to FIG. 5. The triggered event may provide advance notice of critical system operational parameters, such as power supply status, postured well in advance of dispositive events, such as power supply factors inconsistent with reliable system operation, in order to facilitate graceful interleaving of system maintenance functions, such as recharging of batteries or timely battery replacement, without unanticipated performance compromise of the system 100.

In a block 435, relevant system variables are reset, for example in the read-write memory 351 and/or other data storage capabilities 150, at the behest of the interface adapter 337 of FIG. 3, in cooperation with a suitable series of other control and supervision functions and capacities. For example, when batteries 170 are recharged, a count indicative of a number of recharge cycles applicable to current battery elements may be incremented and stored in non-volatile memory, such as in the programmable interface module 137 of FIG. 1 or the module 337 of FIG. 3. Elapsed time and/or other information relative to a current status of battery charge conditions, reflective of current elements incorporated in the system 100 and their related power estimated or measured power draw may be updated or reset for future reference and comparisons.

In a block 440, the process 400 ends, with the system 100 postured for reliable and robust operation with respect to variables monitored in the process 400. Other system functions continue as appropriate to circumstances, following the block 440 or during the course of the process 400.

FIG. 5 shows a flowchart of a process 500 configured for updating variables relative to operation of the system 100, responsive to modifications of hardware, either to actualize desired system capabilities or that are consistent with replacement of consumable elements within the system 100, which replacements may be "like-kind" or which may represent distinction in terms of one or more operational parameters relevant to operation and/or maintenance of the system 100. The process 500 begins in a block 505. Initiation of the process 500 may result from a stand-alone software or instruction set modification or may be reflective of system modification, either including elements not previously incorporated within the system 100 or as an aspect of routine replacement of consumable items, such as batteries 170 that have provided the appropriate reliable useful service life consistent with appropriately robust operation of the system 100.

In a block 510, an internal non-volatile memory is accessed and verified (block 515). For example, such may memory internal to the system 100 may include the field-programmable gate array comprising a portion of the read-write memory 351 of FIG. 3, and may include redundant but separate non-volatile memory elements, such as the memory system 150 of FIG. 1. Control then passes to a query task 520.

In the query task 520, a determination is made with respect to desirability of modification of one or more stored data elements (such as identities and operational data specific to system components which may be replaced or upgraded as a portion of field service). Such evaluation is generally effectuated in conformance with contemporaneous review via qualified service personnel, and may range from quotidian maintenance elements (replacement of batteries with similar or different battery types) to more complex system modifications (replacement of a processor, or even an entire image detection and processing ensemble, such as providing a digital detector array and concomitant signal processing apparatus in lieu of originally-supplied, then state-of-the-art, analog detector assemblies and signal processors).

When the query task 520 determines that modification is desirable and are approved, control passes to a block 525. In the block 525, modified data and/or instruction sets are made available to the system 100 and/or the read-write memory 351 and are included within the system 100, and are then verified (block 530).

Accessing such memory elements typically includes: (i) determination of operational status of the memory system to ensure reliability; (ii) review of version and configuration of system descriptors stored in that memory; (iii) comparison of those descriptors to other information, including revised or revisable system parameters; (iv) provision of or revision of revised data, instruction sets and/or calibration data relevant to current system configuration; and (v) verification of receipt of revised information.

When the query task 520 does not determine that modification is desirable, or when the acts associated with the blocks 525 and 530 have been executed and verified, control passes to a block 535. The process 500 then is concluded, and other system functions continue or are initiated.

IV. EXAMPLES

In the following discussion, several symbols are used. These are defined below. The letter "A" represents estimated system current drawn in Amperes or amps. $T_{HR}$ represents time, that is, a total duration in hours, that the system 100 has been used (turned ON), following the last COMPLETED battery recharge cycle. $T_{MIN}$ represents time, that is, a total duration in MINUTES that the unit has been used (turned ON), following the last COMPLETED recharge cycle.

RC represents an estimated capacity or amount of battery charge remaining at a particular duration of operation, based on time following a last COMPLETED recharge cycle, under conditions corresponding to the original system configuration, that is, without accounting for additional current draw resulting from system modification. In one embodiment, the optical display 247 of FIG. 2 includes a suitable number of individual segments ("# segments") arranged to provide visual indication as a bar graph value in conformance with signals transmitted via the links 134' of FIG. 1, as transmitted by the computer 130, as modified through the programmable interface module 137. TC represents an estimated true capacity or amount of battery charge remaining at a particular duration of operation, based on time following a last COMPLETED recharge cycle, under conditions corresponding to a modified system configuration, that is, including effects of modified or additional current draw, as a result of system modification. Using these notations, true capacity may be estimated as shown below in Eqs. (1A) and (1B).

$$TC = RC - K_1 * T_{HR}, \text{ or} \qquad \text{Eq. (1A)}$$

$$TC = RC - K_2 * T_{MIN}, \qquad \text{Eq. (1B)}$$

where $K_1$ represents a proportionality factor between one system power requirement and another power requirement including effects due to modification of the system 100, and $K_1$ represents such proportionality factor modified in view of an alternative time scale. The value for TC is then displayed in the acts of the block 415 via the display 247 with respect to appropriate time measurement units.

IV(A). Example 1

In a system having a plurality of power-drawing states (e.g., IDLE, DRIVE and EXPOSE), a conservative or worst-case estimate is often desired. These states are then collectively treated as if the system were ON and, in one embodiment, exhibiting a larger of the possible current draws, represented below as $K_3$ Amperes In the discussion below, the term "segments" is used to indicate values to be converted to integers for subsequent calculation and display purposes. When the system is left in IDLE mode for 1 hour ($T_{MIN}$=60), the following corrections to battery capacity estimates are useful:

$$\text{IDLE power consumption estimate} = K_3 \, A * 1 \text{ hour,}$$
$$\text{or} = K_3 \, A\text{-hr.} \qquad \text{Eq. (2)}$$

Under these circumstances, estimated remaining capacity RC is calculated as shown below in Eq. (3):

$$RC = \text{\# segments} - K_3 \, A\text{-hr}/(K_3/\text{\# segments A-hr/segment}), \qquad \text{Eq. (3)}$$

which is rounded appropriately to convert to integer values, for purposes of calculating and then displaying a value for the estimated true capacity TC. Then, $$TC = RC - K_2 * T_{MIN}, \qquad \text{Eq. (4)}$$

which is rounded to a suitable integer value.

As a result, the interface adapter 335 (FIG. 3)/programmable interface module 137 (FIG. 1) firmware and software will modify data from the power supply controller 174 (FIG. 1) and will transmit signals to the module 135 (FIG. 1)/module 235 (FIG. 2)/display/control unit 335 (FIG. 3) to cause an indication such as showing thirty-five segments on the bar graph display 247 of FIG. 2.

IV(B). Example 2

When the system 100 is left in IDLE mode for 3.3 hours ($T_{MIN}$=198 minutes), the following corrections to battery capacity estimates are useful:

$$\text{IDLE power consumption estimate} = K_3 A^* 3.3. \quad \text{Eq. (5)}$$

Under these circumstances, estimated remaining capacity RC is calculated as shown below in Eq. (6):

$$RC = \text{total \# segments} - K_3 A^* 3.3 \text{ A-hr}/(K_3 \text{ A-hr/segment}), \quad \text{Eq. (6)}$$

which is rounded appropriately to convert to integer values, for purposes of calculating and then displaying a value for the estimated true capacity TC. Then, $$TC = RC - K_3 \text{ A-hr}^* T_{MIN}, \quad \text{Eq. (7)}$$

which is rounded appropriately.

Thus, the interface adapter 335 (FIG. 3)/programmable interface module 137 (FIG. 1) firmware and software will modify data from the power supply controller 174 (FIG. 1) and will transmit signals to the module 135 (FIG. 1)/module 235 (FIG. 2)/display/control unit 335 (FIG. 3) to cause an indication such as showing four segments on the bar graph display 247 of FIG. 2. Following a battery charging cycle, resetting of system variables (block 435) results in display 241' of CHARGE COMPLETE in the display 241, coupled with resetting of cumulative battery operation data, incrementing of any counters tracking number of battery charge cycles and the like.

As a result, the system 100 is provided with revised data and instructions. Continuity of capabilities of the system 100 are augmented, and performance, as well as longevity of the system 100, are promoted. As an example, a technical effect promoted by such can include capability of transmission, via digital technologies, of radiographic images having improved diagnostic value for immediate contemplation and evaluation by experts during triage, or even during transportation of a victim of an accident from the situs of the disaster to suitable medical facilities—such as during the "golden moments" immediately following determination of injury that are extremely vital to increasing patient survival, as well as recovery trajectory. These features and advantages can represent significant improvements in system performance, from a capabilities perspective as well as reliability considerations. Such enhancements, in terms of machine-controlled performance in tandem with operator review and approval, may be achieved via the elements described above with reference to FIGS. 1 through 5, as well as in conjunction and cooperation with an operating environment such as that which is described below with reference to FIG. 6.

V. HARDWARE AND OPERATING ENVIRONMENT

Figure 6:
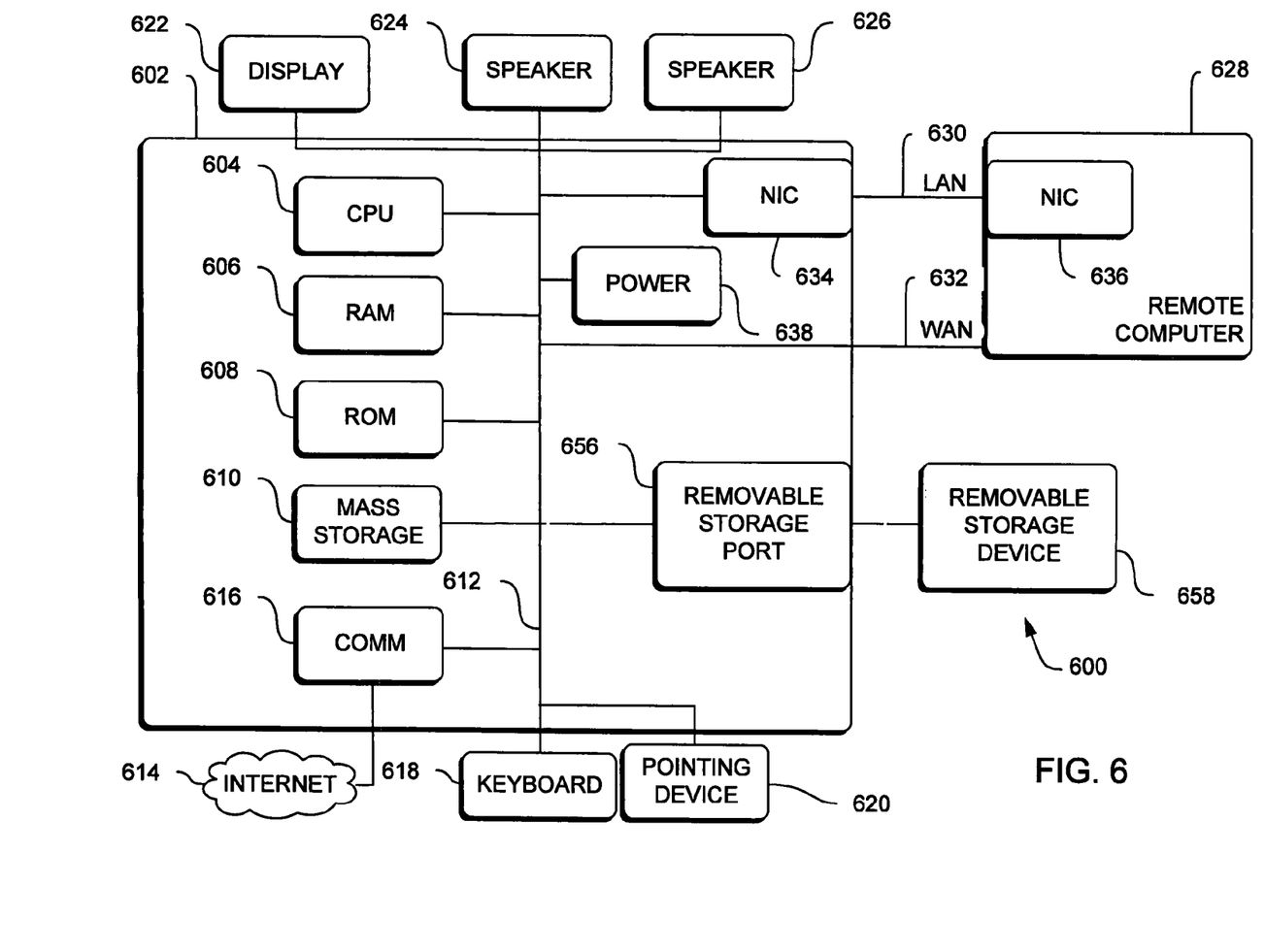
FIG. 6 is a block diagram of a hardware and operating environment in which different embodiments can be practiced.

FIG. 6 is a block diagram of a hardware and operating environment 600, including one or more computers 602, in which different embodiments can be practiced. The description of FIG. 6 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

The computer 602 includes one or more processors 604, commercially available from Intel, Santa Clara Calif.; Motorola, Schaumburg Ill.; Cyrix, now associated with National Semiconductor of Santa Clara Calif.; and others. The computer 602 also includes random-access memory (RAM) 606, read-only memory (ROM) 608, and one or more mass storage devices 610, and a system bus 612, that operatively couples various system components to the processing unit 604 and/or to each other and/or external apparatus. The memories 606 and 608, and the mass storage devices 610, are types of computer-accessible media. Mass storage devices 610 are more specifically types of nonvolatile computer-accessible media and can include one or more hard disk drives, floppy disk drives, optical disk drives, and tape cartridge drives. The processor 604 executes computer programs stored on these various computer-accessible media.

The computer 602 can be communicatively connected to the Internet 614 via a communication device 616. Internet 614 connectivity is well known within the art. In one embodiment, a communication device 616 is a modem that responds to communication drivers to connect to the Internet via what is known in the art as a "dial-up connection." In another embodiment, the communication device 616 includes an Ethernet® or similar hardware network card connected to a local-area network (LAN) that itself is connected to the Internet 614 via what is known in the art as a "direct connection" (e.g., Ti line, etc.).

A user enters commands and information into the computer 602 through input devices such as a keyboard 618 or a pointing device 620. The keyboard 618 permits entry of textual information into computer 602, as known within the art, and embodiments are not limited to any particular type of keyboard 618. The pointing device 620 permits the control of the screen pointer provided by a graphical user interface (GUI) of operating systems such as versions of the Microsoft Windows® operating system. Embodiments are not limited to any particular pointing or tactile input device 620. Such pointing devices 620 include mice, touch pads, trackballs, remote controls and point sticks. Other input devices (not shown) can include a microphone, joystick, game pad, satellite dish, scanner, or the like.

In some embodiments, the computer 602 is operatively coupled to a display device 622 via the system bus 612. The display device 622 permits the display of information, including computer, video and other information, for viewing by a user of the computer 602. Embodiments are not limited to any particular display device 622, which may include cathode ray tube (CRT) displays (monitors), as well as flat panel displays such as liquid crystal displays (LCD's). In addition to a monitor 622, computers 602 typically include other peripheral input/output devices such as printers (not shown). Speakers 624 and 626 may provide audio output signals, responsive to commands delivered through the system bus 612.

The computer 602 also includes an operating system (not shown) that is stored on the computer-accessible media RAM 606, ROM 608, and mass storage device 610, that is accessed and executed by the processor 604. Examples of operating systems include the Microsoft Windows®, Apple MacOS®, Linux® and UNIX® operating systems. Examples are not limited to any particular operating system, however, and the construction and use of such operating systems are well known within the art.

Embodiments of the computer 602 are not limited to any type of computer 602. In varying embodiments, the computer 602 comprises a PC-compatible computer, a MacOS® operating system compatible computer, a Linux® operating system compatible computer, or a UNIX® operating system compatible computer. The construction and operation of such computers are well known within the art.

The computer 602 can be operated using at least one operating system to provide a graphical user interface (GUI) including a user-controllable pointer. The computer 602 can have at least one web browser application program executing within at least one operating system, to permit users of the computer 602 to access an intranet, extranet or Internet 614 world-wide-web pages as addressed by Universal Resource Locator (URL) addresses. Examples include the Netscape Navigator® and the Microsoft Internet Explorer® browser programs.

The computer 602 can operate in a networked environment using logical connections to one or more remote computers, such as a remote computer 628. These logical connections are achieved by a communication device coupled to, or forming a part of, the computer 602. Embodiments are not limited to a particular type of communications device. The remote computer 628 can be another computer, a server, a router, a network PC, a client, a peer device or other common network node. The logical connections depicted in FIG. 6 include a local-area network (LAN) 630 and a wide-area network (WAN) 632. Such networking environments are commonplace in offices, enterprise-wide computer networks, intranets, extranets and the Internet 614.

When used in a LAN-networking environment, the computer 602 and remote computer 628 are connected to the local network 630 through network interfaces or adapters 634, which is one type of communications device 616. The remote computer 628 also includes a network device 636. When used in a conventional WAN-networking environment, the computer 602 and remote computer 628 communicate with a WAN 632 through one or more modems (not shown). The modem, which can be internal or external, is connected to the system bus 612. In a networked environment, program modules depicted relative to the computer 602, or portions thereof, can be stored in the remote computer 628.

The computer 602 also includes a power supply 638. Each power supply 638 can be a battery, as noted above. The computer 602 also may include a removable memory storage port 656 capable of accepting a removable data storage device 658 (analogous to the port 156 and removable data storage device 158 of FIG. 1), which provides capability for revision of machine-readable instructions, among other things. Computer-readable instructions and/or data may also be supplied to the computer 620 via coupling to a suitably-programmed removable data storage device 658 and/or via a carrier wave including modulation of computer-readable information coupled from external sources, such as the Internet 614 or other external interconnections.

The computer 602 may function as one or more of the control segments of module 120 (FIG. 1), the computer 130, the operator console 140 and/or the data acquisition and conditioning module 160, for example, via implementation of the processes 300, 400, 500 and 600 of FIGS. 3 through 6 as computer program modules.

VI. CONCLUSION

A computer-based medical imaging system is described. Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all object-oriented, database and communication environments and alternate technologies which provide the same functionality as described herein.

What is claimed is:

1. A system having a signal conditioning module, the module including a non-volatile memory and the module having a non-transitory computer readable medium configured to:
    receive signals from a controller contained in the system, the signals including a power ON signal;
    initiate a time-measurement element responsive to the power ON signal to assess a current duration of operation of the system;
    recall an existing cumulative record of system operation from the non-volatile memory;
    combine the existing cumulative record with the current duration to provide a representation of a running elapsed time;
    record the running elapsed time in the non-volatile memory;
    compare the running elapsed time to a threshold; and
    indicate when the running elapsed time has traversed the threshold.

2. The system of claim 1, wherein the non-transitory computer readable medium of the module is further configured to reset the existing cumulative record upon completion of a battery-charging event.

3. The system of claim 1, further comprising an X-ray imaging system including a battery-powered mobility function.

4. The system of claim 1, further comprising an X-ray imaging system including a digital detector array, wherein the non-volatile memory includes a template descriptive of current draw for the system including the digital detector array.

5. The system of claim 1, further comprising an X-ray imaging system including a digital detector array, wherein the non-volatile memory includes a template descriptive of current draw for the system including the digital detector array, the module being further configured to accept and store a revised template in the non-volatile memory.

6. The system of claim 1, further comprising an X-ray imaging system including a digital detector array, wherein the non-volatile memory includes a cumulative total value for one or more system operations parameters.

7. The signal conditioning module of claim 1, further comprising an X-ray imaging system and wherein the non-volatile memory includes a cumulative total value for estimated battery discharge subsequent to a most-recently completed battery recharge cycle.

8. A process operative within a system including non-volatile memory capability, the process comprising:
receiving signals from a controller contained in the system, the signals including a power ON signal;
initiating a time-measurement element responsive to the power ON signal to assess a current duration of operation of the system;
recalling an existing cumulative record of system operation from the non-volatile memory;
combining the existing cumulative record with the current duration to provide a representation of a running elapsed time;
recording the running elapsed time in the non-volatile memory;
comparing the running elapsed time to a threshold; and
indicating when the running elapsed time has traversed the threshold.

9. The process of claim 8, further comprising resetting the existing cumulative record upon completion of a battery-charging event.

10. The process of claim 8, wherein the system comprises an X-ray imaging system including a battery-powered mobility function.

11. The process of claim 8, wherein the system comprises an X-ray imaging system including a digital detector array, and wherein the non-volatile memory includes a template descriptive of current draw for the system including the digital detector array.

12. The process of claim 8, wherein the system comprises an X-ray imaging system including a digital detector array, wherein the non-volatile memory includes a template descriptive of current draw for the system including the digital detector array, the process further comprising accepting and storing a revised template in the non-volatile memory.

13. The process of claim 8, wherein the system comprises an X-ray imaging system including a digital detector array, and wherein the non-volatile memory includes a cumulative total value for one or more system operations parameters.

14. The process of claim 8, wherein the system comprises an X-ray imaging system and wherein the non-volatile memory includes a cumulative total value for estimated battery discharge subsequent to a most-recently completed battery recharge cycle.

15. An article of manufacture having a non-transitory computer readable medium, the non-transitory computer readable medium having computer code embodied thereon that includes computer-readable instructions, which, when executed by one or more processors, causes the one or more processors to:
receive signals from a controller contained in the system, the signals including a power ON signal;
initiate a time-measurement element responsive to the power ON signal to assess a current duration of operation of the system;
recall an existing cumulative record of system operation from the non-volatile memory;
combine the existing cumulative record with the current duration to provide a representation of a running elapsed time;
record the running elapsed time in the non-volatile memory;
compare the running elapsed time to a threshold; and
indicate when the running elapsed time has traversed the threshold.

16. The article of manufacture of claim 15, wherein the computer-readable instructions include instructions configured to cause the one or more processors to reset the existing cumulative record upon completion of a battery-charging event.

17. The article of manufacture of claim 15, wherein the system comprises an X-ray imaging system including a battery-powered mobility function.

18. The article of manufacture of claim 15, wherein the system comprises an X-ray imaging system including a digital detector array, wherein the non-volatile memory includes a template descriptive of current draw for the system including the digital detector array.

19. The article of manufacture of claim 15, wherein the system comprises an X-ray imaging system including a digital detector array, wherein the non-volatile memory includes a template descriptive of current draw for the system including the digital detector array, and wherein the computer-readable instructions include instructions configured to cause the one or more processors to accept and store a revised template in the non-volatile memory.

20. The article of manufacture of claim 15, wherein the system comprises an X-ray imaging system and wherein the non-volatile memory includes a cumulative total value for estimated battery discharge subsequent to a most-recently completed battery recharge cycle.

* * * * *